(12) United States Patent
Fitch

(10) Patent No.: US 8,358,984 B2
(45) Date of Patent: Jan. 22, 2013

(54) UPDATING CHANNEL ESTIMATES

(75) Inventor: Michael R Fitch, Suffolk (GB)

(73) Assignee: British Telecommunications public limited company, London (GB)

( * ) Notice: Subject to any disclaimer, the term of this patent is extended or adjusted under 35 U.S.C. 154(b) by 48 days.

(21) Appl. No.: 12/935,204

(22) PCT Filed: Mar. 25, 2009

(86) PCT No.: PCT/GB2009/000786
§ 371 (c)(1),
(2), (4) Date: Sep. 28, 2010

(87) PCT Pub. No.: WO2009/122138
PCT Pub. Date: Oct. 8, 2009

(65) Prior Publication Data
US 2011/0014885 A1 Jan. 20, 2011

(30) Foreign Application Priority Data
Mar. 31, 2008 (EP) ...................................... 08251271

(51) Int. Cl.
*H03C 1/62* (2006.01)
*H04M 1/00* (2006.01)
*H04H 20/67* (2008.01)

(52) U.S. Cl. .................... 455/115.1; 455/562.1; 370/339

(58) Field of Classification Search ................ 455/115.1, 455/73, 427, 63.1, 67.11, 452.2, 422.1, 450, 455/561, 68; 370/338, 281, 328, 260, 252, 370/427, 339; 375/267, 299, 260
See application file for complete search history.

(56) References Cited

U.S. PATENT DOCUMENTS

| | | | |
|---|---|---|---|
| 6,754,475 B1 * | 6/2004 | Harrison et al. | 455/115.1 |
| 7,653,142 B2 * | 1/2010 | Ketchum et al. | 375/267 |
| 8,102,830 B2 * | 1/2012 | Yokoi et al. | 370/339 |
| 2004/0077378 A1 | 4/2004 | Kim | |
| 2005/0181731 A1 * | 8/2005 | Asghar et al. | 455/63.1 |
| 2005/0181739 A1 | 8/2005 | Krasny et al. | |

OTHER PUBLICATIONS

International Search Report for PCT/GB2009/000786, mailed Apr. 29, 2009.

* cited by examiner

Primary Examiner — Nay A Maung
Assistant Examiner — Cindy Trandai
(74) Attorney, Agent, or Firm — Nixon & Vanderhye P.C.

(57) ABSTRACT

MIMO OFDM receiver which periodically forms a channel estimate and compares: a: an estimate of the capacity of the channel if the transmitter were to make use of the receiver's channel estimate (closed loop) with b: an estimate of the capacity of the channel if the transmitter were to make no use of channel estimate (open loop), and send data on the channel estimate to the transmitter only when (b−a)>k, where k is a pre-set threshold.

13 Claims, 2 Drawing Sheets

UPDATING CHANNEL ESTIMATES

This application is the U.S. national phase of International Application No. PCT/GB2009/000786 filed 25 Mar. 2009, which designated the U.S. and claims priority to European Application No. 08251271,6, filed 31 Mar. 2008, the entire contents of each of which are hereby incorporated by reference.

BACKGROUND AND SUMMARY

This invention relates to communicating channel estimates, and specifically to determining when to transmit a channel estimate.

Multiple element antenna arrangements have been the subject of intense research over the past few years as a way of increasing the coverage or capacity of a wireless link. (See "Introduction to Space-Time Wireless Communications" by Paulraj, Nabar and Gore). The generic case is where both the transmitter and receiver(s) on a link have multiple antenna elements all operating on the same radio channel and advantage is taken of the spatial and time differences between them. This system is known as MIMO (multiple input, multiple output), and is typically based on spatial multiplexing.

There are several ways in which MIMO can be implemented, but two general categories can be distinguished.

In a first type of system, the transmitter uses no knowledge of the channel in determining what signals to transmit via which antennas. This type of system is called open-loop MIMO. In open-loop MIMO the transmitter typically transmits equal energy from each antenna element and applies symbol coding that is resilient to any channel conditions. An example of such coding is the Alamouti coding specified by the WiMAX forum.

In a second type of system the transmitter uses knowledge of the channel to determine what signals to transmit via which antennas. That knowledge is gained through feedback from the receiver. This type of system is called closed-loop MIMO. In a closed-loop MIMO system, the transmitter can use algorithms to set energy allocation and coding across the antennas in dependence on its knowledge of the channel. This can increase capacity and/or signal to interference ratio. However, in order to achieve these gains it is necessary for the receiver to feed back information about the channel. That feedback uses some capacity, and so there is a need to balance the gains obtained from more detailed channel knowledge against the capacity overhead that is lost to sending channel feedback information.

To address this balance, a considerable amount of research has looked for ways of maximising the coverage and capacity of closed-loop MIMO systems using a minimum of feedback. The problem with this approach is that the characteristics of the channel change when any part of the channel alters: for example when the transmitter or the receiver moves, or when an object moves in the propagation path. Therefore, when a minimum of feedback is employed the coverage and capacity are not increased greatly beyond open-loop conditions.

The 3GPP (Third Generation Partnership Project) have adopted a code-book method in their LTE (long term evolution) system. In the code-book system a label is sent to the transmitter from which the transmitter can look up the multi-path matrix that most closely resembles the channel, similar to items in a catalogue. However, this system is restrictive to a certain number of channel types and is far from optimum. (See "Grassmannian Beamforming for MIMO Wireless Systems" by David Love for a general discussion of code-book methods). Another approach to reducing the bandwidth needed to provide channel feedback information is to assess the channel periodically at the receiver and to send back to the transmitter a channel condition number (see for example "Switching Between Diversity and Multiplexing in MIMO systems" by Heath and Paulraj, 2005).

There is a need to improve the balance between gains that can be had from making use of channel information at a spatial multiplexing, MIMO, transmitter and the loss of bandwidth that results from feeding back channel information to the transmitter.

According to one aspect of the present invention there is provided a transceiver for operation in a spatial multiplexing antenna communication system, the receiver comprising signal processing equipment configured to: form a channel estimate for a channel between the transceiver and a second transceiver; estimate capacity of the channel in dependence on the channel estimate; determine in dependence on the estimated channel capacity whether to transmit data indicating that estimate to the second transceiver; and cause the transceiver to transmit data indicating that estimate to the second transceiver only if the said determination is positive.

According to a second aspect of the present invention there is provided a method for controlling a transceiver for operation in a spatial multiplexing antenna communication system, the method comprising: forming a channel estimate for a channel between the transceiver and a second transceiver; estimating capacity of the channel in dependence on the channel estimate; determining in dependence on the estimated channel capacity whether to transmit data indicating that estimate to the second transceiver; and transmitting data indicating that estimate to the second transceiver only if the said determination is positive.

The said determination may comprise: estimating the capacity of the channel if the second transceiver were to know the channel estimate ("a"); and estimating the capacity of the channel if the second transceiver were to have no knowledge of the channel ("b"); determining that data indicating the channel estimate should be transmitted if (a–b) exceeds a predetermined threshold. The predetermined threshold may be zero, or may be greater or less than zero. The transceiver may be configured to estimate the value of a by means of a water-filling algorithm.

The transceiver may be a MIMO transceiver and/or an ODFM transceiver.

The transceiver may be configured to determine when to form the channel estimate in dependence on the frequency with which channel estimates have previously been transmitted to the second transceiver.

The said data indicating the channel estimate may be data expressing the change in the channel estimate since it was last transmitted to the second transceiver.

BRIEF DESCRIPTION OF THE DRAWINGS

The present invention will now be described by way of example with reference to the accompanying drawings. In the drawings.

DETAILED DESCRIPTION OF THE PRESENT EXAMPLE EMBODIMENTS

Figure 1:
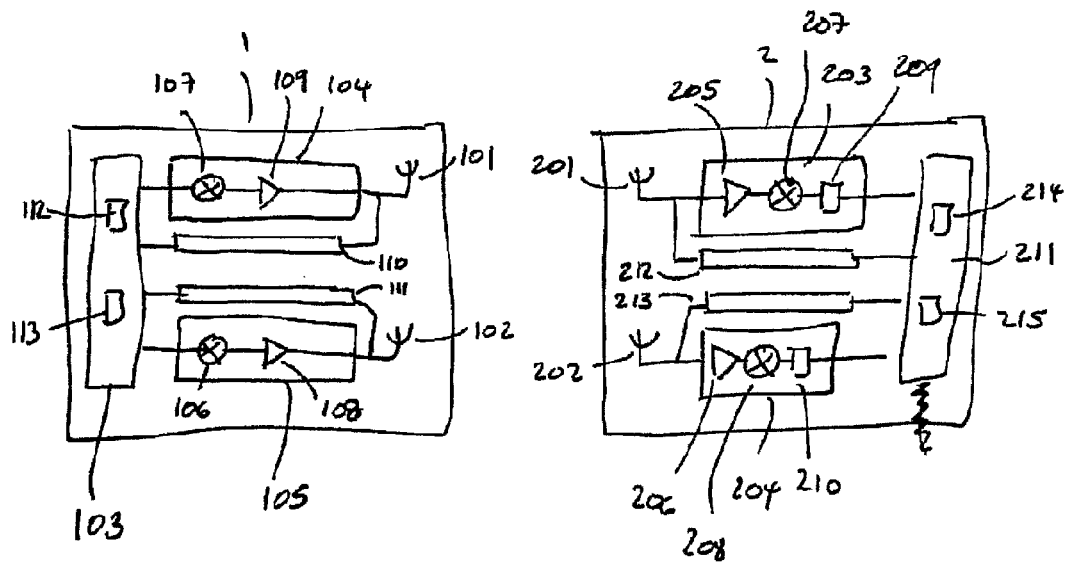
FIG. 1 is a schematic diagram of a communication system.

The system of FIG. 1 is a MIMO system whose receiver employs an algorithm to determine when to feed back channel information. Broadly speaking, the algorithm involves estimating the channel capacity, and determining when to feed back channel information in dependence on the estimated channel capacity. For example, the receiver may periodically compare:
  a: an estimate of the capacity of the channel if the transmitter were to make use of the receiver's channel information with
  b: an estimate of the capacity of the channel if the transmitter were to make no use of channel information, and
to update the transmitter only when (b−a)>k, where k is a pre-set threshold. That threshold could be zero, in which case the update would take place if b>a.

FIG. 1 shows a spatial multiplexing antenna system in which the present approach can be used. The system comprises a transmitter 1 and a receiver 2. The transmitter and the receiver each have multiple antenna elements 101, 102, 201, 202, so there are four communication channels between them: 11 to 201, 101 to 202, 102 to 201 and 102 to 202. The transmitter and receiver are preferably MIMO transceivers. The transmitter has a baseband processor section 103 which receives traffic data for transmission and generates symbols for transmission by each antenna, and two analogue transmit chains 104, 105 which comprise mixers 106, 107 for upconverting those signals to radio frequency and amplifiers 108, 109 for amplifying the upconverted signals to drive a respective one of the antennas. The receiver has analogue receive chains 203, 204 which comprise amplifiers 205, 206 for amplifying signals received at a respective one of the antennas, mixers 207, 208 for downconverting the amplified signals and analogue-to-digital converters 209, 210 for digitising the downconverted signals to provide an input to baseband processor section 211.

The receiver 2 can also provide feedback to the transmitter 1, and the transmitter 1 can receive that feedback. For this purpose, the receiver 2, has transmit chains 212, 213 which are analogous to those of the transmitter 1, and the transmitter 1 has receive chains 110, 111 which are analogous to those of the receiver 2. The description below will discuss the feedback of channel estimates from receiver 2 to transmitter 1, but similar principles could be used to govern the feeding back of channel estimates from transmitter 1 to receiver 2 for use in optimising subsequent transmissions by the receiver 2.

The baseband processing sections 103, 211 comprise processors 112, 214. Each processor executes instructions stored in an associated memory 113, 215 in order to perform its functions.

In this example the transmitter and receiver operate according to an OFDM (orthogonal frequency division multiplexing) protocol.

As in other closed-loop MIMO-OFDM systems, the receiver 2 can estimate the channels between the transmitter and itself by means of the processing section 211. These estimates are known as $\hat{H}$. The receiver can send messages to the transmitter to update the transmitter's knowledge of the receiver's estimates. As indicated above, the receiver does not feed back $\hat{H}$ at pre-determined intervals. Instead, it decides when to feed back $\hat{H}$ based on current channel conditions.

The information in the feedback messages may take various forms. Three example forms of the feedback are changes in $\hat{H}$ (or $\Delta\hat{H}$), codebook labels or the eigenvectors from singular value decomposition (SVD). In the present example, the receiver sends changes in $\hat{H}$ back to the transmitter, and the consequent SVD is performed at both the transmitter and the receiver. Although this approach could require extra processing, it is typically more efficient overall to send back the changes in $\hat{H}$ rather than to send $\hat{H}$ itself. Preferably, in addition to reporting changes in $\hat{H}$ the full $\hat{H}$ is also sent from time to time.

A simulation of the present approach will now be described. Although the metrics presented for determining when to feed back information are independent of the modulation scheme that is used, the simulation uses gray-coded QPSK without forward-error correction. OFDM is used with a fast Fourier transformation (FFT) size of 256.

The channel model used in the simulations is based on the ITU channel B Pedestrian 6-tap model (see ITU-R Recommendation M.1225. "Guidelines for Evaluation of Radio Transmission Technologies for IMT-2000," 1997. Page 28) which has been modified for MIMO use based on correlation methods from Ericsson, "MIMO Channel model for TWG RCT ad-hoc proposal," V16, 2006 and using antenna and angle spread parameters taken from the 3GPP spatial channel model (SCM) (see 3GPP, "Spatial channel model for MIMO simulations" TR 25.996 V 6.1.0 (2003-09), Technical Report. [Online]. Available: http://www.3gpp.org/). The Pedestrian B channel was chosen because it is the most demanding of the ITU channel models in terms of bit error rate (BER) performance against signal to noise ratio (SNR). This is caused by one of the taps being comparable in size to the initial signal resulting in very deep fast fading. When in space-time block coding (STBC) mode, the Alamouti code is used (see S. M. Alamouti, "A simple transmit diversity technique for wireless communications," IEEE J. Sel. Area Commun., vol. 16, no. 8, pp. 1451-1458, October 1998).

The channel model used in the present simulations generates any required number of H MIMO channel matrices and is 'non-physical' in the sense that the path is treated as baseband from the transmitter to receiver, including the correlation of the antennas. This dependency on the antennas is slightly restrictive but leads to a much simpler model than ray-tracing or geometrical methods. The restriction is not considered important since potentially typical antenna configurations of 4λ spacing at the transmitter (assumed to be a base-station) and λ/2 at the receiver (assumed to be a user terminal) are used.

The calculation of the channel matrix H is performed using the following formula, for a MIMO system with $N_R$ receiver antennas and $N_T$ transmitter antennas:

$$vec(H) = R_{MIMO}^{1/2} vec(G) \qquad (1)$$

where vec(·) is to vectorize a given matrix. $R_{MIMO}$ represents the spatial correlation matrix for all the MIMO channels, which can be split into correlation seen at the transmitter end from that at the receiver end by the Kronecker function:

$$R_{MIMO} = R_T \otimes R_{RX} \qquad (2)$$

which carries the assumption that each transmitter antenna element identically illuminates every element in the receiver array.

In the 2×2 MIMO system the $R_{TX}$ and $R_{RX}$ have the following elements:

$$R_{TX} = \begin{bmatrix} 1 & \alpha \\ \alpha^* & 1 \end{bmatrix} R_{RX} = \begin{bmatrix} 1 & \beta \\ \beta^* & 1 \end{bmatrix} \quad (3)$$

where the complex values of α and β are taken from Ericsson, "MIMO Channel model for TWG RCT ad-hoc proposal," V16, 2006 for the antenna element spacings listed above and are different for each tap. This reference also contains values for other common element spacings. The $N_R \times N_T$ matrix G is comprised of i.i.d. elements derived from Rayleigh, Ricean and log-normal shadowing distribution functions, and it also incorporates the Doppler effect according to 3GPP, "Spatial channel model for MIMO simulations" TR 25.996 V 6.1.0 (2003-09) by multiplying a time varying factor $\phi_v$ to each of its elements.

The channel matrices H delivered by the model are 4 dimensional, the first two dimensions containing the index of receiver and transmitter antennas and the third and fourth dimensions containing the tap index and time samples of the channel impulse response respectively.

In an OFDM system it is desirable to apply MIMO techniques to every subcarrier or every group. Because of this segmentation in the frequency domain, it is more convenient to have H in terms of the channel frequency response, which can be obtained from the impulse response by performing an FFT, denoting the result as H(f).

As described above, in a closed-loop MIMO-OFDM system, the receiver estimates the channel and sends updates on the channel state to the transmitter. The transmitter uses these updates to choose the most appropriate transmission scheme. If perfect channel state information (CSI) is known at the receiver and transmitter, then the MIMO channels on each subcarrier can be decomposed into parallel non-interfering sub-channels using the singular value decomposition (SVD). Thus for a certain time sample, the instantaneous channel transfer matrix on the ith channel segment can be expressed as:

$$H(f)_i = U_i D_i V_i^H \quad (4)$$

where $U_i$ and $V_i$ are unitary matrices, and $D_i$ is the diagonal matrix of the singular values of $H(f)_i$, the operator $(\cdot)^H$ is the conjugate transpose operator. Then the received symbol vector on the ith subcarrier has the form:

$$r_i = U_i D_i V_i^H s_i + n \quad (5)$$

where $s_i$ is the transmitted symbol vector and n is the additive noise. Now if one uses a precoding matrix $v_i$ and a decoding matrix $U_i^H$ at the transmitter and receiver respectively, the received symbol becomes:

$$\tilde{r}_i = D_i s_i + \tilde{n} \quad (6)$$

Since the $U_i$ matrix is unitary, the variance of the noise in (5) and (6) is the same. Equation (6) also implies that the transmitted symbol vector put into $K=\min(N_R, N_T)$ parallel sub-channels will be amplified or diminished by the singular values and those put into channels which have index larger than K will be lost.

Meanwhile the transmitter can allocate the total available power across all the sub-channels for all the subcarriers to maximize the MI since it has the CSI. The optimal power allocation can be obtained by using the water-filling algorithm (see M. A. Khalighi, J.-M. Brossier, G. Jourdain, and K. Raoof, "Water filling Capacity of Rayleigh MIMO channels," IEEE International Symposium on Personal, Indoor and Mobile Radio Communications, vol. 1, pp. 155-158, 2001 and I. E. Telatar, "Capacity of multi-antenna Gaussian channels," Europ. Trans. Telecommun., vol. 10, no. 6, pp. 585-595, November-December 1999). Note that the constraint of the total power for the optimisation becomes $N_T \cdot n_f$ for this MIMO-OFDM case, where $n_f$ stands for the number of the subcarriers in use. Therefore, the transmitted symbol vector on the ith subcarrier after precoding and power allocation becomes:

$$x_i = v_i Q_i s_i \quad (7)$$

where the diagonal matrix $Q_i$ represents the power allocation matrix including the power allocated to each sub-channel.

Figure 2:
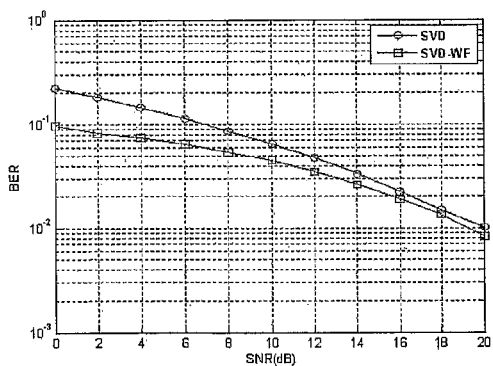
FIG. 2 illustrates a comparison of the BER performance for SVD with and without water-filling.

A demonstration of the improvement to the BER performance due to the water-filling algorithm is shown in the simulation results in FIG. 2. The simulations are done in a 2×2 MIMO-OFDM system with a FFT size of 256 for a speed of 3 km/hr for independently Rayleigh fading channels. The water-filling algorithm gives greatest benefit at low SNRs. At high SNR the water-filling algorithm almost identically allocates power on the sub-channels and hence the curves converge. This emphasises that CSI feedback from the receiver to transmitter is of significant value.

In a feedback system, the CSI at the transmitter will be delayed by an amount that depends upon the system protocols. At time $t_n$, the received signal will be, from (5) and (7), $$r_i(t_n) = U_i(t_n) D_i(t_n) V_i^H(t_n) V_i(t_x) Q_i(t_x) s_i(t_n) + n \quad (8)$$

where the $t_x$ is a time sample in the past. Simulations having a bearing on the selection of the maximum interval between $t_n$ and $t_x$ will now be described.

Assuming a perfect channel estimation at the receiver, the changes in H(f) at time samples $t_1 t_0$ and $t_1 = t_0 + 500$ for each subcarrier using the ITU-B Pedestrian model at 1 km/hr for the 2×2 system have been simulated, with each time sample being one OFDM symbol and a symbol rate of 10 kbaud. Taking the first subcarrier as an example, the detailed values of H(f) for two time samples with 500 samples interval are shown below:

$$H(f)(:,:,1,1) = \begin{bmatrix} 0.4022 - 0.5119i & -0.6935 - 0.1160i \\ -0.1292 + 0.5553i & 0.6860 - 0.0247i \end{bmatrix}$$

$$H(f)(:,:,1,501) = \begin{bmatrix} 0.3588 - 0.4263i & -0.6672 - 0.0832i \\ -0.0131 + 0.5477i & 0.6969 - 0.1626i \end{bmatrix}$$

This demonstrates the advantage of feeding back the changes in H(f) rather than feeding back H(f) itself, to reduce the overhead of the feedback.

Assuming that both the transmitter and receiver have perfect CSI at the start of the simulation, the effect of sending changes in H(f) (i.e. ΔH(f)) back to the transmitter with a uniform quantization of 0.03 and a 500 samples update rate can be modelled. Table 1 shows the number of bits that must be sent back for each real and imaginary part of every element for the ITU-B Pedestrian model at various speeds for the 2×2 system, to maintain the 1 dB degradation. The quantisation bits are composed of 1 sign bit to denote whether the change is increasing or decreasing, and the other bits to denote the changes in the absolute values.

TABLE 1

| | Time varying range of the amplitude in H(f) | | |
|---|---|---|---|
| Speed (km/hr) | Change in real part of elements | Change in imaginary part of elements | Bits |
| 1 | 0.2866 | 0.2817 | 4 |
| 3 | 0.8925 | 0.9003 | 6 |
| 10 | 2.1278 | 2.3827 | 7 |

Figure 3:
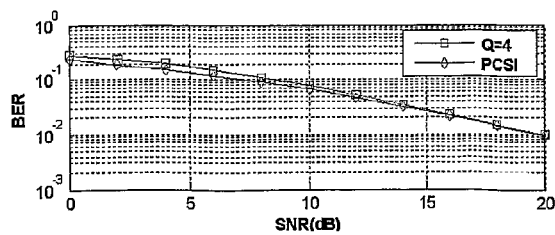
FIG. 3 illustrates a comparison of the BER performance with quantised feedback and with perfect CSI.

FIG. 3 illustrates a comparison of the BER performance with the quantised feedback assuming perfect CSI. The simulation results indicate that the BER performance with speed 1 km/hr using the quantised feedback has 1 dB degradation compared with perfect CSI at the transmitter in the 2×2 MIMO-OFDM system with SVD (no water-filling).

The metric used to control the feedback interval is based on mutual information (MI).

The MI without water-filling and with water-filling are calculated from:

Without water-filling (identical power allocation):

$$C_I = \frac{1}{n_f} \sum_{i=1}^{n_f} \log_2 \det\left(I + \frac{P}{N_t \sigma^2} H(f)_i(t_n) H(f)_i^H(t_n)\right) \quad (10)$$

With water-filling power allocation:

$$C_{WF} = \frac{1}{n_f} \sum_{i=1}^{n_f} \log_2 \det\left(I + \frac{1}{\sigma^2} H(f)_i(t_n) \hat{Q}_i(t_x) H(f)_i^H(t_n)\right) \quad (11)$$

where P is the total power at the transmitter, I is a $N_R \times N_R$ identity matrix, $\sigma^2$ is the noise variance and $\hat{Q}_i(t_x)$ is the power allocation matrix for the ith subcarrier by applying the water-filling algorithm to the $t_x$th time sample.

Since the power allocation given by $\hat{Q}_i(t_x)$ will become more and more unmatchable to the time varying channels $H(f)_i(t_n)$, the water-filling algorithm performance deteriorates with time, and after a number of time samples its performance will become worse than that of the system without using water-filling, i.e. the identical power allocation. This can advantageously be used as a threshold for determining when to feed back channel information to the transmitter. If $C_{WF} \leq C_I$, then update the transmitter CSI.

Figure 4:
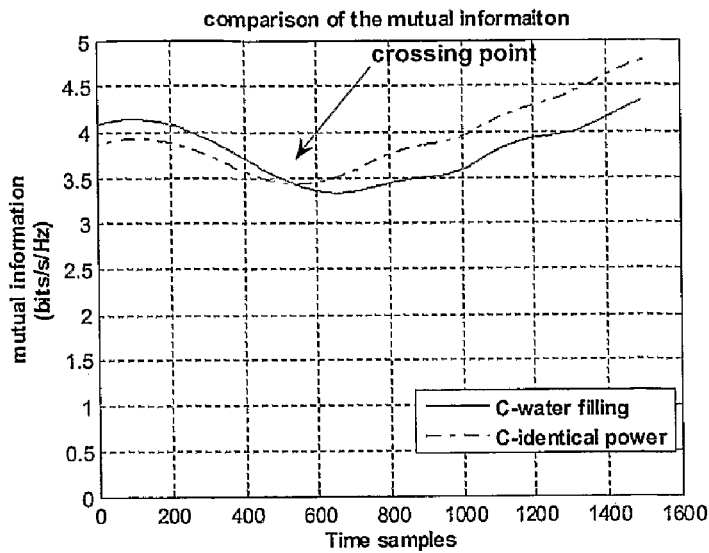
FIG. 4 illustrates how the water-filling performance degrades over time when not updated. The crossing point indicates when the performance with water-filling is equal to the performance without.

FIG. 4 shows a plot of $C_I$ and $C_{WF}$ for the ITU-B Pedestrian model at 10 km/hr. Recall that at t=0 the transmitter is assumed to have perfect CSI. The point where $C_{WF} \leq C_I$ is around 500 data points, after which the curves diverge and the curve for $C_{WF}$ is always lower than that for $C_I$, which implies that the time position for the update is the crossing point of the two curves. The required update period as gauged from this metric is similar to the CMD method, supporting this update period as being advantageous.

MI has more computational overhead than some alternative algorithms due to the two summations required, however a benefit of MI is that it can be extended to switching the transmitter from SM to STBC when the channel rank decreases such that the system cannot support SM. Further, if the SNR is high but the rank is low then there may be a strong line-of-sight signal and this information can be sent to the transmitter as an aid to adaptively altering the modulation and coding scheme.

Figure 5:
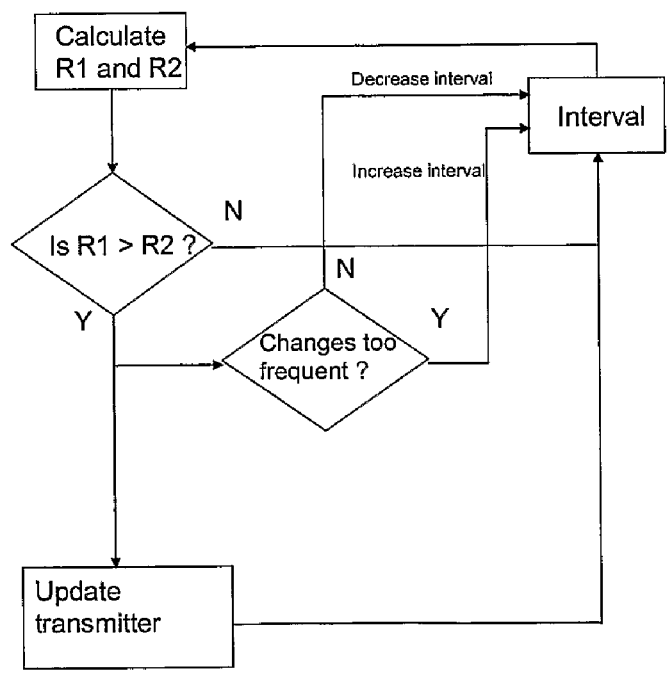
FIG. 5 illustrates an algorithm for determining when to update a transmitter with channel information.

In one embodiment of the present approach, whether to send an update to the transmitter is determined in dependence on the channel capacity assuming channel knowledge (R1) and also the channel capacity assuming no channel knowledge (R2). As described above, updating is performed if R1 deteriorates below a predetermined threshold relative to R2. R1 and R2 can be calculated at the receiver using known formulas. An example of this method is illustrated in FIG. 5. FIG. 5 also illustrates that the interval at which R1 and R2 (and accordingly the underlying channel estimates) are calculated can be varied in dependence on the frequency with which updates are sent to the transmitter. The receiver will periodically carry out the capacity calculations and decide whether to send feed-back based on whether the difference threshold is exceeded. The receiver can alter the period between calculations adaptively, based on the amount by which the threshold is exceeded and on the threshold value history. This is the function carried out by the 'changes too frequent' box in FIG. 5.

The metrics described herein are independent of system type and can therefore be modified to fit with the protocol and frame structure of any adopting system. For example with WiMAX, although a user terminal can decide when to send an update, the 802.16 protocol demands that the base-station has to allocate slots to transmit it and this process will add delay.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A transceiver for operation in a spatial multiplexing antenna communication system, the transceiver comprising signal processing equipment configured to:
   form a channel estimate for a channel between the transceiver and a second transceiver;
   estimate, in dependence of the channel estimate, the capacity of the channel if the second transceiver were to know the channel estimate ("a");
   estimate, in dependence of the channel estimate, the capacity of the channel if the second transceiver were to have no knowledge of the channel ("b");
   determine if (a–b) exceeds a predetermined threshold; and
   cause the transceiver to transmit data indicating the channel estimate to the second transceiver only if the said determination is positive; wherein
   a period between estimates of a and b is altered adaptively based on the amount by which the threshold is exceeded and on a threshold value history.

2. The transceiver as claimed in claim 1, wherein the predetermined threshold is zero.

3. The transceiver as claimed in claim 1, wherein the transceiver is configured to estimate a by means of a water-filling algorithm.

4. The transceiver as claimed in claim 1, wherein the transceiver is a MIMO transceiver.

5. The transceiver as claimed in claim 1, wherein the transceiver is an ODFM transceiver.

6. The transceiver as claimed in claim 1, wherein the transceiver is configured to determine when to form the channel estimate in dependence on a frequency with which channel estimates have previously been transmitted to the second transceiver.

7. The transceiver as claimed in claim 1 wherein the said data indicating the channel estimate is data expressing the change in the channel estimate since it was last transmitted to the second transceiver.

8. A method for controlling a transceiver for operation in a spatial multiplexing antenna communication system, the method comprising:
forming a channel estimate for a channel between the transceiver and a second transceiver;
estimating, in dependence of the channel estimate, the capacity of the channel if the second transceiver were to know the channel estimate ("a");
estimating, in dependence of the channel estimate, the capacity of the channel if the second transceiver were to have no knowledge of the channel ("b");
determining if (a−b) exceeds a predetermined threshold; and
transmitting data indicating the channel estimate to the second transceiver only if the said determination is positive; wherein
a period between estimates of a and b is altered adaptively based on the amount by which the threshold is exceeded and on a threshold value history.

9. The method as in claim 8, wherein the predetermined threshold is zero.

10. The method as in claim 8, wherein at least one of the estimating is performed via a water-filling algorithm.

11. The method as in claim 8, further comprising determining when to form the channel estimate in dependence on a frequency with which channel estimates have previously been transmitted to the second transceiver.

12. The method as in claim 8, wherein the said data indicating the channel estimate is data expressing the change in the channel estimate since it was last transmitted to the second transceiver.

13. A non-transitory computer-readable medium storing instructions, which upon execution by a computer system, control a transceiver for operation in a spatial multiplexing antenna communication system, the control comprising:
forming a channel estimate for a channel between the transceiver and a second transceiver;
estimating, in dependence of the channel estimate, the capacity of the channel if the second transceiver were to know the channel estimate ("a");
estimating, in dependence of the channel estimate, the capacity of the channel if the second transceiver were to have no knowledge of the channel ("b");
determining if (a−b) exceeds a predetermined threshold;
transmitting data indicating the channel estimate to the second transceiver only if the said determination is positive; and
altering adaptively a period between estimates of a and b based on the amount by which the threshold is exceeded and on a threshold value history.

\* \* \* \* \*